April 15, 1969   H. H. WAGNER   3,438,361
HYDRAULIC-ELECTRIC SPEED CONTROL GOVERNOR
Filed Nov. 24, 1967

INVENTOR.
HAROLD H. WAGNER
ATTORNEYS

United States Patent Office 3,438,361
Patented Apr. 15, 1969

3,438,361
HYDRAULIC-ELECTRIC SPEED CONTROL GOVERNOR
Harold H. Wagner, Peoria, Ill., assignor to Caterpillar Tractor Co., Peoria, Ill., a corporation of California
Filed Nov. 24, 1967, Ser. No. 685,554
Int. Cl. F02d 37/00, 1/04
U.S. Cl. 123—99        8 Claims

ABSTRACT OF THE DISCLOSURE

An engine speed control governor in which the rate of fuel supplied to the combustion chambers is controlled first by an electrical speed measuring device, then by a mechanical measuring device, and then by the electrical speed measuring device again. During initial engine cranking, the electrical speed measuring device sets the fuel delivery rate at a fast idle speed position for delivery of fuel to the combustion chambers. As the engine begins to turn over under its own power, the mechanical speed measuring means reduces the fuel rate to a low idle position. As the engine begins to warm up and its fuel pressure begins to rise, the force exerted by the mechanical speed device is overcome and the electrical speed measuring device again takes control of the governor and controls it throughout normal operation of the engine.

---

Conventional mechanical governors utilized to control engine speeds generally operate through the interaction of flyweights and an opposing governor spring. The flyweights are mounted on a member which rotates at a speed proportional to the engine speed and assume a position determined by the centrifugal force supplied by the rotating member. This in turn determines the position of a fuel control member. When the fuel control member is positioned to supply fuel so that the engine operates at a speed which rotates the flyweights with sufficient centrifugal force to counteract the opposing governor spring, constant speed operation is obtained. Selected operating speed may be obtained by adjustment of the governor spring.

In U.S. Patent 3,145,624, assigned to the assignee of this application, Parks et al. disclosed an improved mechanical governor having a hydraulic servo means operatively disposed between the flyweights and the fuel control member so that the flyweights do not operate the fuel control member directly but, rather, with a hydraulic assist. Through that invention, it became possible to employ a governor spring capable of exerting only moderate counter-balanced forces and to avoid the use of springs having high counter-balanced forces which makes the spring difficult to adjust when a variation in engine operating speed is desired.

In many practical applications, it is desirable to control engine speed more closely than the normal mechanical governor will allow. In such cases, attempts have been made to use electric speed control governors. While these have the ability to control engine speed closely and are rather simple to install, they have several disadvantages which are usually compensated for by the addition of a greater amount of electrical and mechanical equipment which adds to the bulk and cost of the complete governor. Further, failure of certain components in the electrical system can cause damage to engine parts while allowing the engine to overspeed. When the usual electric governor is energized, the engine fuel pump rack is instantly set in an open position allowing the engine to quickly accelerate to a fast rate of speed during a cold start. Other disadvantages are inability to reduce engine speed if engine oil pressure is reduced below a certain safe level, and lack of manual control if the electric governor fails.

It is therefore an object of the present invention to provide an engine speed control governor, utilizing a combination of electrical and mechanical control means for the governor, which is inexpensive to manufacture and maintain.

It is also an object of the present invention to provide a governor having the advantages of a safety unit in a compact system without resorting to the addition of individual units for controlling engine acceleration, engine oil pressure failures, or mechanical control.

It is also an object of the present invention to provide a governor wherein the actuator is required to provide only a relatively small force when moving the fuel pump rack of the engine.

It is also an object of the invention to provide a governor wherein, should there be a failure of the electrical portion of the governor, the hydro-mechanical portion of the governor would take over so as to reduce or maintain engine speed and obviate the problem of overspeed.

It is a further object of the invention to provide a governor which permits the engine to accelerate gradually from a cold start and eliminates the necessity of providing additional electrical equipment to restrain engine acceleration.

It is a still further object of the invention to provide a governor which automatically reduces engine speed upon failure of engine oil pressure.

It is also an object of the invention to provide a governor wherein, should the electrical system fail, it can be disconnected and the hydro-mechanical system may be used during the emergency.

Further and more specific objects and advantages of the invention will become apparent to those skilled in the art upon reviewing the following specification wherein a preferred form of the invention is described by reference to the accompanying drawing.

Figures 1, 2:
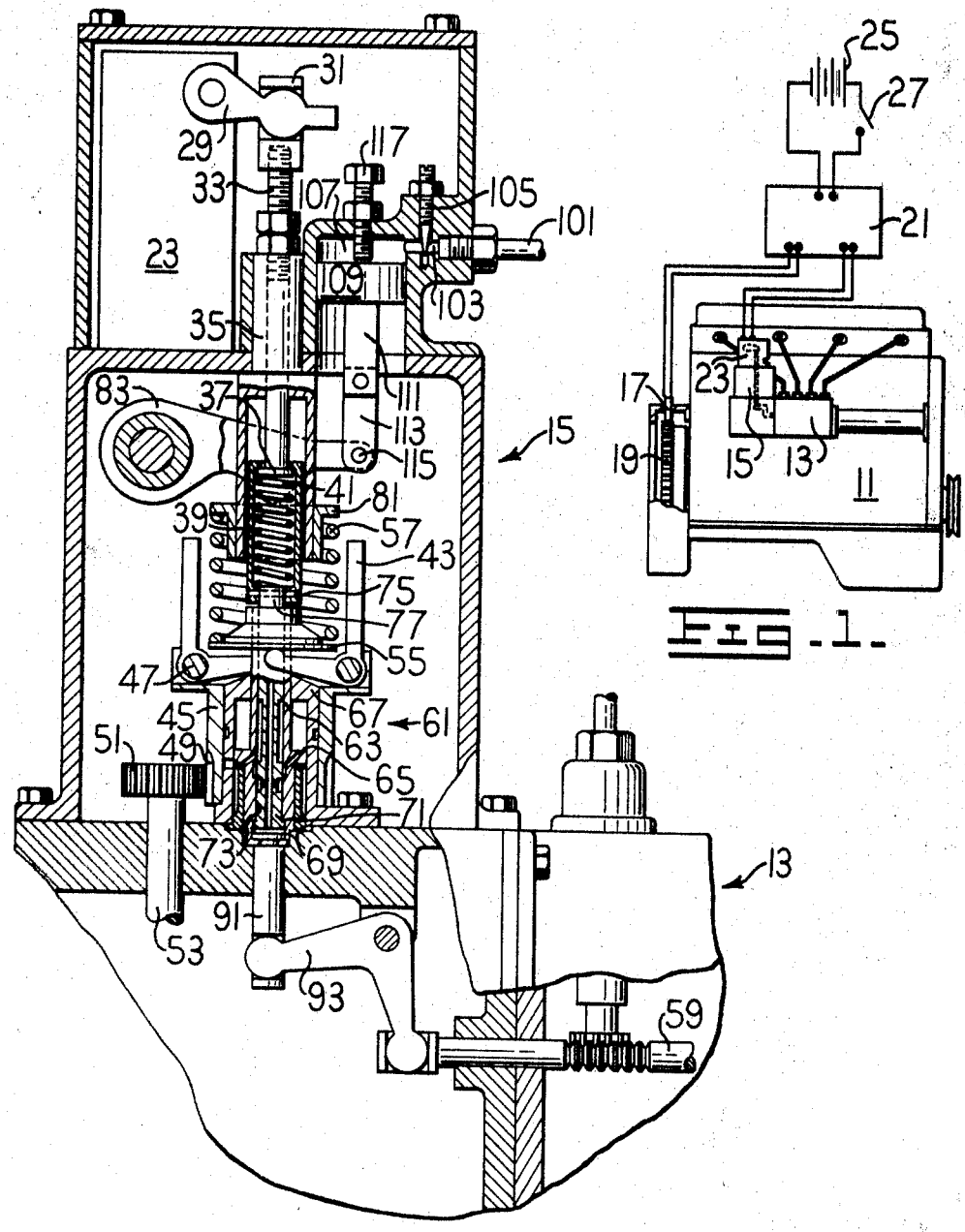
FIG. 1 is a schematic sketch showing the electrical control system of the governor of the present invention.
FIG. 2 is a side elevation sectional view of the governor of the present invention with some parts broken away.

Referring to the drawings now in greater detail, there is shown in FIG. 1 an engine 11 having a fuel distribution means 13 and a governor 15. A magnetic pickup 17 receives a pulse signal from flywheel 19 as the flywheel rotates and transmits it to a control unit 21. The control unit, in turn, transmits a voltage, proportional to engine speed, to an electrical actuator 23. Power for the control unit 21 is received through suitable circuitry such as battery 25 and switch 27, for example.

Referring now to FIG. 2, actuator 23 is shown to have an arm 29 suitably mounted for moving cooperation with a member 31 threadably mounted on a shaft 33 which is slidable in a guide bushing 35. On the lower end of shaft 33, a shoulder 37 carries, and is slidable within, a cylindrical adapter 39. The adapter has mounted therein a spring 41 disposed between shoulder 37 and the opposite end of the adapter 39.

A set of flyweights 43 are pivotally mounted in a carrier 45 as by pin 47. Carrier 45 is toothed, as at 49, to provide a pinion in constant mesh with a drive gear 51 secured to a shaft 53 forming a part of the timing gear train of the engine.

Flyweights 43 moves radially under the influence of changing engine speed to move a thrust member 55 against the opposing force of a governor spring 57. This axial movement of member 55 exerts a force on the fuel control member or engine rack bar 59 through an intermediate hydraulic servo system generally indicated at 61.

Servo system 61 includes a ported piston 63 having a piston head 65, slidable in a cylinder 67, and a piston body of reduced diameter slidably maintained within a fixed sleeve 69. A valve spool 71 is slidably maintained within a central bore 73 of piston 63. Valve spool 71 is connected to adapter 39 by means of a connecting rod 77 which is affixed to the adapter by a pin 75.

Thrust member 55 is slidable on connecting rod 77 and governor spring 57 interacts between thrust member 55 and a retainer 81 that is positioned by a governor lever 83. A relatively small upward movement of thrust member 55 enables it to engage adapter 39 tending to compress spring 41 moving valve 71 and piston 63 upwardly.

Control of the valve 71, thereby providing hydraulic boost, may be obtained in the manner described in Parks, et al. Patent 3,145,624.

As seen in the drawing, moving of piston 63 in the upward direction creates a similar movement in a shaft 91 which in turn causes a bellcrank 93 to rotate in such a manner as to move the fuel pump rack 59 to a decreased or low idle fuel position.

In operation of the device as thus far described, when it is desired to start the engine, switch 27, in the circuitry shown schematically in FIG. 1, is closed and the engine is cranked. This provides a suitable electric signal to actuator 23, imparting a clockwise motion, as shown in FIG. 2, to arm 29 and a downward motion of shaft 33. This downward motion is transmitted through spring 41 and actuator 39 to servo means 61 and shaft 91. As shaft 91 moves downwardly, bellcrank 93 rotates in a counterclockwise direction moving fuel pump rack 59 to a fast idle position. As the engine turns under its own combustion power, gear 51 drives flyweight carrier 45 causing the flyweights 43 to move radially outwardly. This causes thrust member or collar 55 to move upwardly against the force of governor spring 57 and spring 41, causing shaft 91 to be drawn upwardly. This in turn causes bellcrank 93 to be actuated in a clockwise direction, thereby causing fuel pump rack 59 to be drawn to a low idle position.

As the engine builds up speed and oil pressure, engine oil enters an inlet 101 and flows through a variable orifice passage 103, controlled by a needle valve 105, and into a chamber 107. As the oil pressure in chamber 107 increases, a piston 109 is forced downwardly, causing a rod 111, secured to a link 113 that is connected to lever 83 through a pin 115, to urge lever 83 downwardly compressing spring 57 and forcing collar 55 in a downward direction. As pressure increases in chamber 107, arm 83 compresses spring 57 still further, increasing the spring force and thereby moving flyweights 43 inwardly. This in turn causes the servo mechanism 61 to be moved downwardly by hydraulic boost action thereby urging shaft 91, bellcrank 93 and rack 59 to an increased fuel position.

When piston 109 has been moved to its lowest position in chamber 107, the compressive force of spring 57 causes collar 55 to move flyweights 43 to a position similar to that shown in FIG. 2. Collar 55 is disengaged from adapter 39 in this position and actuator 23 thereby controls the movements of valve 71 and, through piston 65, the fuel control rack 59.

It can thus be seen that the applicant has provided a governor wherein an electrical actuator means places a fuel control rack at fast idle position during initial starting, a mechanical actuator means automatically returns the fuel control means to a low-idle speed during engine warmup, and engine oil pressure at the completion of engine warmup causes return of the governor control to the electrical actuator means. Should there be a failure of engine oil pressure, piston 109 will return to the upper portion of chamber 107, thereby allowing the mechanical actuator of the governor to once again move the fuel control means to a low idle position, thus slowing down the engine. As seen in FIG. 2, it is possible to control the minimum speed to which the engine may be reduced by the mechanical actuator by means such as a bolt 117 extending into chamber 107 which allows the determination of the uppermost position of piston 109. Further, if manual control of the governor is desired, it would only be necessary to fix a crank or shaft to the shaft about which arm 83 pivots.

Thus the applicant has provided an engine control governor which embodies the advantages of both a mechanical and an electrical speed control governor, while obviating most of the disadvantages of each type.

I claim:
1. In a governor, an electrical actuator, means for providing a signal proportional to engine speed to said electrical actuator, hydraulic boost means operatively connected to said electrical actuator, and fuel volume control means operatively connected to said hydraulic boost means, a mechanical actuator, means for providing a signal proportional to engine speed to said mechanical actuator, said mechanical actuator also being operatively connected to said hydraulic boost means, and means in said governor for allowing either said electrical actuator or said mechanical actuator to control said hydraulic boost means.

2. In a governor, an electrical actuator operatively connected to a fuel metering means, a mechanical actuator operatively connected to said fuel metering means, and a control means for determining which of said actuators will exclusively actuate said fuel metering means.

3. The governor of claim 2 wherein said control means is an engine oil pressure responsive means.

4. The governor of claim 2 wherein said control means includes a cylinder into which engine oil flows, a piston in said cylinder and actuatable by said engine oil, and means connected to said piston for counterbalancing a force exerted by said mechanical actuator.

5. The governor of claim 4 and means in said governor for allowing the force exerted by said mechanical actuator to overcome the force exerted by said electrical actuator when said engine oil is at a pressure below a predetermined limit.

6. The method of controlling fuel delivered to an engine combustion chamber comprising the steps of providing an electrical signal proportional to engine speed to a governor, providing a mechanical signal proportional to engine speed to said governor, providing a hydraulic signal to said governor, selecting either said electrical signal or said mechanical signal depending upon the strength of said hydraulic signal, and transferring fuel to said engine at a rate determined by said selected signal.

7. The method of governing engine speed comprising the steps of actuating a fuel transfer means in a governor, in relation to an electrical measurement of engine speed, to a high engine speed position overcoming said actuation and reactuating said fuel transfer means, to a low engine speed position, in relation to a mechanical measurement of engine speed, overcoming said reactuation and controlling said fuel transfer means by said electrical measurement.

8. The method of claim 7 wherein said step of overcoming said reactuation comprises the steps of hydraulically actuating a piston in said governor by engine oil pressure and displacing the means for utilizing said mechanical measurement for reactuation of said fuel transfer means.

References Cited
UNITED STATES PATENTS

| 2,205,047 | 6/1940 | Nardone | 123—99 |
| 2,589,788 | 3/1952 | Fell | 123—140.3 |
| 2,623,509 | 12/1952 | Gold et al. | 123—140.3 |
| 2,670,724 | 3/1954 | Reggio | 123—140.31 |
| 3,128,750 | 4/1964 | Schmidt | 123—140.3 |
| 3,166,989 | 1/1965 | Cowles et al. | 91—366 XR |

CORNELIUS J. HUSAR, *Primary Examiner.*

U.S. Cl. X.R.

123—140